United States Patent
Wübbels

(10) Patent No.: US 6,701,702 B2
(45) Date of Patent: Mar. 9, 2004

(54) MACHINE FOR MOWING STALK-LIKE CROP

(75) Inventor: Richard Wübbels, Rhede (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/281,444

(22) Filed: Oct. 25, 2002

(65) Prior Publication Data

US 2003/0079457 A1 May 1, 2003

(30) Foreign Application Priority Data

Oct. 26, 2001 (DE) .......................... 101 52 984

(51) Int. Cl.$^7$ .............................................. A01D 45/02
(52) U.S. Cl. .............................. 56/103; 56/13.8; 56/94
(58) Field of Search ........................... 56/6, 13.6, 13.8, 56/13.9, 14.2, 14.3, 14.5, 53, 60, 94, 102, 103, 192, 341

(56) References Cited

U.S. PATENT DOCUMENTS 5,237,804 A * 8/1993 Bertling .......................... 56/60
5,722,225 A * 3/1998 Wuebbels et al. ............. 55/60
5,852,922 A * 12/1998 Over Behrens et al. ...... 56/14.7
6,298,643 B1 * 10/2001 Wuebbels et al. ............. 56/60

FOREIGN PATENT DOCUMENTS

| DE | 195 27 607 A | 1/1997 |
| EP | 0 760 200 A | 5/1997 |
| EP | 1 008 291 A | 6/2000 |

* cited by examiner

*Primary Examiner*—Árpád Fábián Kovács

(57) ABSTRACT

A machine for mowing stalk-like crop includes a plurality of intake and mowing arrangements mounted in side-by-side relationship to each other and operative to deliver the mowed crop to a transverse crop conveying channel located behind the intake and mowing arrangements. The width of the channel available for carrying harvested crop is constructed so as to be variable in accordance with the amount of crop being conveyed at any location along the channel so that a positive conveyance of the crop always takes place without plugging.

10 Claims, 3 Drawing Sheets

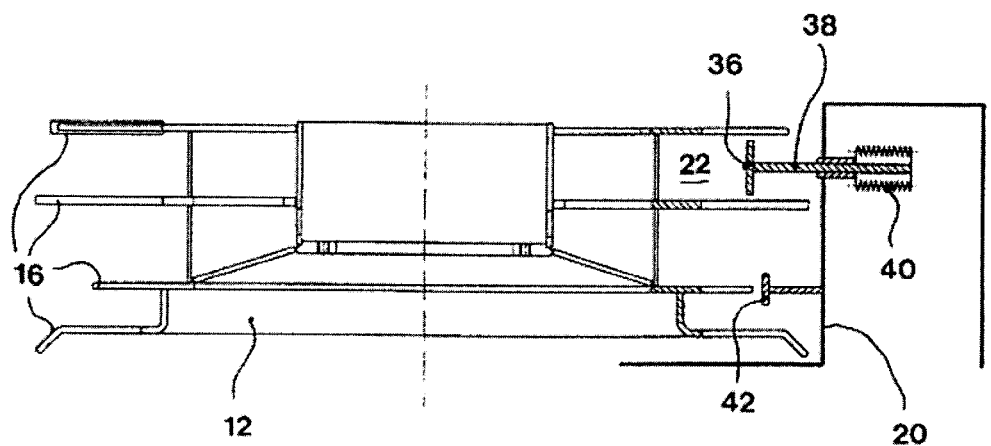
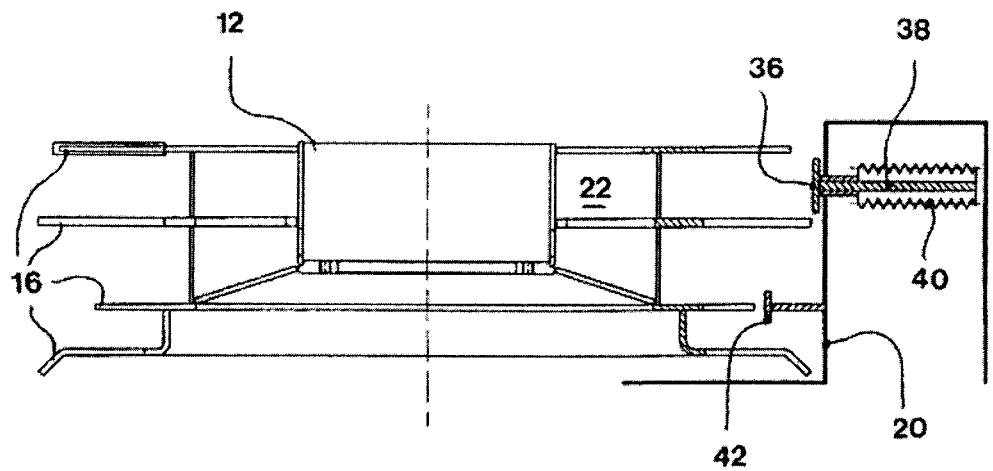

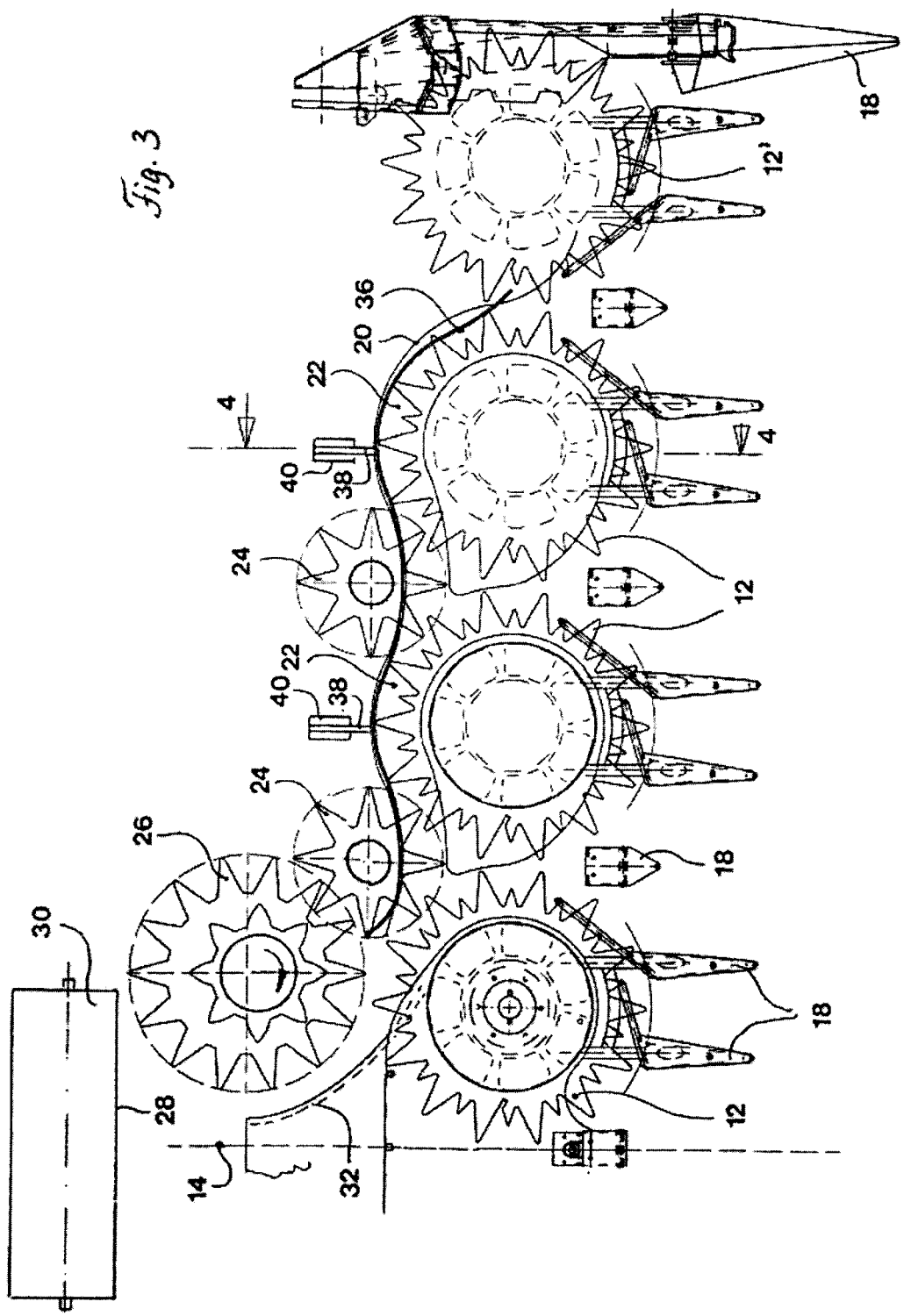

MACHINE FOR MOWING STALK-LIKE CROP

FIELD OF THE INVENTION

The invention concerns a machine for mowing stalk-like crop having several intake and mowing arrangements arranged in side-to-side spaced relationship to each other for the cutting and conveying of the crop and at a rear side of which a conveying channel is provided through which the cut crop can be conveyed to a forage harvester.

BACKGROUND OF THE INVENTION

A mowing arrangement for stalk-like cereal crop is described in DE 195 27 607 A which is equipped with four conveying and mowing disks distributed over the operating width. The crop is mowed by the conveying and mowing disks, transported in pocket-shaped recesses at their rear sides and cleaned out of the pocket-shaped recesses by clean-out disks rotating in the same direction. The crop is then transported by the clean-out disks along the rear wall of the mowing arrangement until it is taken over by the rear side of a conveying and mowing disk arranged further inward. Thereby the crop is transported along the rear wall in alternating turns by the conveying and mowing disks and by the clean-out disks.

EP 0 760 200 A discloses another machine for the mowing of stalk-like crop in which several intake and mowing drums are distributed over the operating width. The crop is transported at the rear side of the intake and mowing drums inward along the rear all while it is conveyed in the gore region between adjoining intake and mowing drums by transverse conveying drums, that extend through slots in the rear wall.

EP 1 008 291 A proposes a further machine for the harvesting of stalk-like crop that is equipped with several drum-shaped intake elements distributed over the operating width for taking up and conveying of the crop. The crop is conducted by the take-up to an independent transverse conveyor that is arranged behind the take-up elements in the forward direction of operation. The transverse conveyor conveys the crop along a guide wall that is arranged immediately behind the take-up elements. The transverse conveyors are conveyor drums or conveyor belts.

Regardless of the question whether the crop is conveyed in the conveying channel to the center of the machine by means of the intake and mowing drums (DE 195 27 607 A, EP 0 760 200 A) or a transverse conveyor independent of these (EP 1 008 291 A), it has been shown that the dimensioning of the conveying channel is problematic. If its width is selected so large that it can accept even the largest conceivable amounts, then with small amounts of throughput, the crop is poorly retained and conveyed, since it does not fill the conveying channel and does not interact in a satisfactory way with the conveying elements. If the width of the conveying channel is reduced, it cannot accept larger amounts of conveyed crop which can result in jams.

The problem underlying the invention is seen in the need to define a machine for the mowing of stalk-like crop that can satisfactorily process smaller as well as larger amounts of conveyed crop.

SUMMARY OF THE INVENTION

This problem is solved according to the invention by providing the machine for mowing of stalk-like crop with a conveying channel having a width which is adjustable as a function of the amount of harvested crop present. In this way, an automatic conforming of the width of the conveying channel to the amount of crop conveyed is attained. With small amounts of crop, the conveying channel is restricted by the width defining element, so that the crop is retained and transported securely even with a small throughput. On the other hand, with larger amounts of throughput, the width definition element opens the entire width of the conveying channel so that no jams develop.

In order to control the movement of the width definition element, the use of an electronic control would fundamentally be conceivable which detects the immediate flow of the crop by optical, capacitive or other sensors and moves the width definition element by means of actuators, for example, electric motors, electromagnets or hydraulic cylinders. However, for reasons of cost, a practical solution is to have the width definition element be repositioned by the crop itself. In this embodiment, the width definition element is loaded by a force. The crop moves the width definition element against this force into a position in which the conveying channel is widened. If the intensity of the flow of the crop is later reduced, the width definition element is again brought into that position in which the conveying channel is narrowed by means of the force.

The force against which the crop moves the width definition element, is preferably generated by a spring of any desired type. The spring may have a range of motion that is limited by stops. It can also be provided with a pre-load when the width definition element is in a rest position, that is, when there is no flow of crop, so that a force differing from zero must be applied in order to move the width definition element out of the rest position. The use of a weight would also be conceivable that is connected over rope pulls and/or deflecting levers to the width definition element and generates the force needed to be applied to the width definition element by the force of gravity.

In principle, it would be possible to configure the width definition element as a driven conveying element. In that way, intake and mowing arrangements, which transport the harvested crop along their rear sides, could be used as a width definition element and supported in bearings, free to move. Transverse conveying drums and/or clean-out discs used for conveying the crop may also be provided as movable width definition elements. Alternatively, separate conveying elements that convey the crop to the center of the machine independently of the intake and mowing arrangements, could be used as width definition elements. However, since it is technically costly to drive movable elements, a practical solution is to configure the width definition element as a guide element that is not driven.

In many cases, the amount of crop conveyed changes over the length of the conveying channel, since harvested crop from the outer intake and mowing arrangements is added to the harvested crop from the inner intake and mowing arrangements. It must therefore be preferred that the width definition element be arranged to define a width of the conveying channel that varies over the length of the conveying channel.

This varying width can be attained fundamentally in two ways. On one hand, a width definition element is conceivable that is formed and attached in the conveying channel in such a way that the width of the conveying channel depends in the desired way on the immediate position. As a rule, it will be smaller in the outer region than further inward. In case a greater flow of crop occurs, the width definition element is moved as a whole, so that a widening of the conveying channel occurs. Thereby, a predetermined change in the width of the width definition element occurs over its entire length. It can be selected so as to be constant over the entire length of the width definition element or in such a way that the conveying channel is wider at the inner end by a fixed percentage more that the width of the outer end. Such a change in width can be attained by a width definition element that is rigid in itself and can be moved and guided in the transverse direction or at an angle to the conveying channel.

Indeed, the flow of the crop supplied by the individual intake and mowing arrangements, which is successively conducted to the flow of the crop in the conveying channel, is not always homogeneous. There may, for example, be irregularities in the stand of the crop, that lead to the fact that the flow of the crop does not increase in the inward direction as would be expected from a homogeneous stand of the crop. In a change of the width predetermined over the length of the width definition element, this would result in a less than optimal conveying of the crop in one of the regions. Therefore, on the other hand, a practical solution is that the width definition element can be varied over its length corresponding to the local quantities to be conveyed. For this purpose, the width definition element can be composed of individual independent elements that follow each other in the longitudinal direction of the conveying channel and/or elements flexible in themselves and/or be supported in bearings, free to pivot, about an at least approximately vertical axis.

In order to keep the number of parts small, a practical solution is to use only a single width definition element, that essentially extends over the length of the conveying channel. It would also be possible to use single, individual width definition elements, arranged in the longitudinal direction of the conveying channel, behind each other, that are configured as rigid elements, or in order to reduce the friction, as rolls or pulleys, free to rotate. The latter may be suspended separately, free to move against a force.

The width definition element is preferably configured in the form of a skid. Its surface is relatively small, so that only a small amount of friction occurs in the contact with the conveyed crop. Furthermore, in case of wear, only a small and low cost single element need be exchanged. It would also be conceivable to use a wall bordering the conveying channel as a movable width definition element.

The invention is preferably applied to a machine in which the harvested crop is conducted in a conveying channel oriented transverse to the forward operating direction, that is located on the rear side of the intake and mowing arrangements and is defined on its rear side by a rear wall. Here the transverse transport can be performed through the rear sides of the intake and mowing arrangements interacting with transverse conveyor drums and/or clean-out disks along the rear wall. In such a machine, the width definition element is arranged between the intake and mowing arrangements and the rear wall, so that the conveying channel is defined between the intake and mowing arrangements and the width definition element moves in the direction towards the rear wall when the flow of the crop increases. In this embodiment, the shape of the width definition element conforms to the wave form of the rear wall.

BRIEF DESCRIPTION OF THE DRAWINGS

The drawings show an embodiment of the invention that shall be described in greater detail in the following.

FIG. 2 is a cross section taken through the machine shown in FIG. 1 along line 2—2.

FIG. 3 is a plan view of the machine like that of FIG. 1, but shown in a condition wherein the conveyor channel is filled with crop.

FIG. 4 is a cross section taken through the machine shown in FIG. 3 along the line 4—4.

DESCRIPTION OF THE PREFERRED EMBODIMENT

Figure 1:
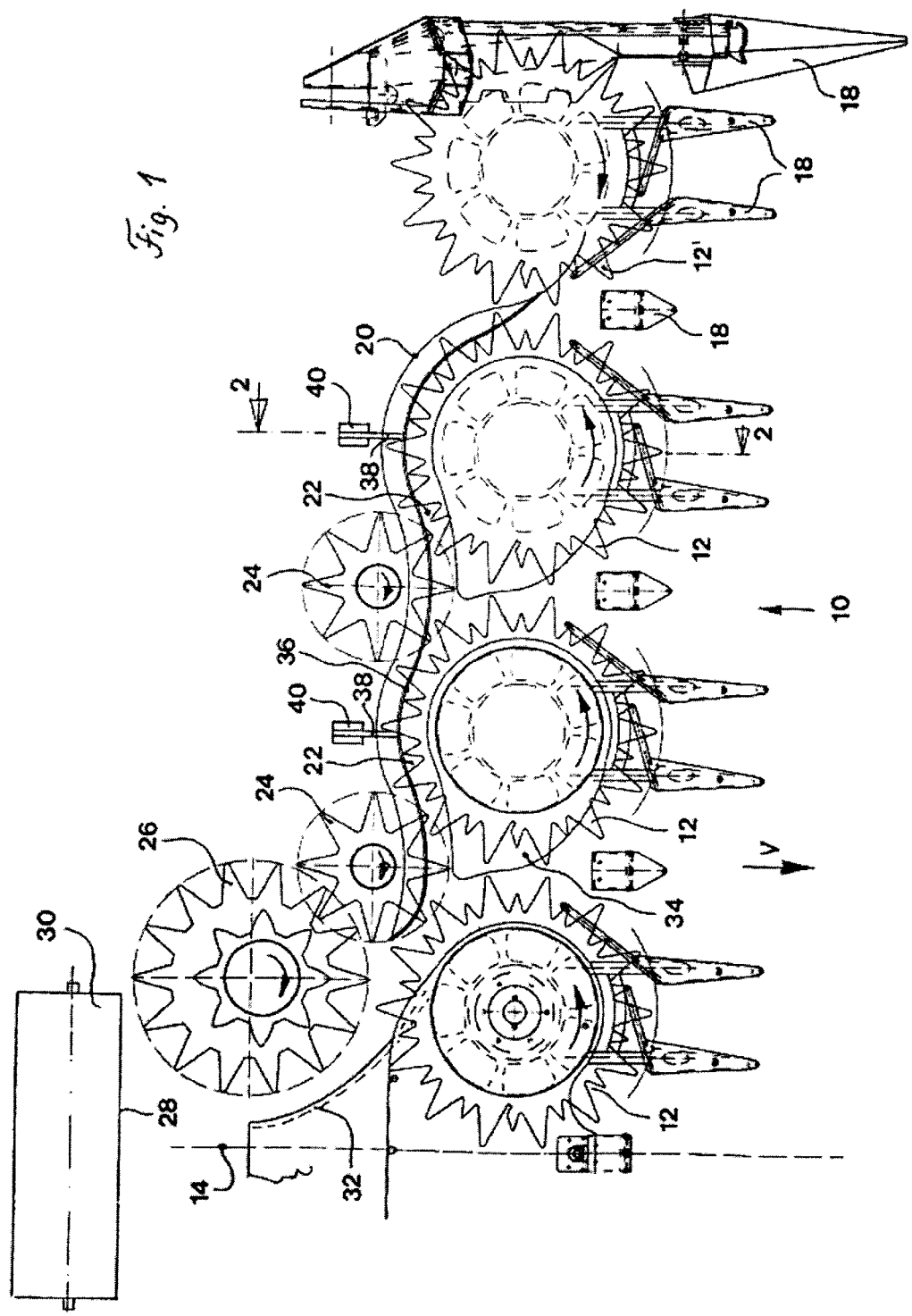
FIG. 1 is a plan view of a machine according to the invention for the mowing of stalk-like crops and shown in a condition not loaded with crop.

The machine 10 shown in FIG. 1 for the mowing of stalk-like crop is provided with eight intake and mowing drums 12 used as intake and mowing arrangements that are arranged symmetrically about a longitudinal center plane 14 of the machine 10. On each side of the longitudinal center plane 14, there are four intake and mowing drums 12 of which only those arranged on the left of the longitudinal center plane are shown.

The intake and mowing drums 12, that operate independent of rows, are composed of mower cutting disks, not shown, that rotate about an approximately vertical axis, and conveyor disks 16 (see FIG. 2) arranged coaxially above these, whose circumference is equipped with pocket-shaped recesses. Stalk dividers 18 are arranged ahead of the intake and mowing drums 12. A conveying channel 22 is oriented transverse to the forward operating direction V at a location between the rear side of the intake and mowing drums 12 and a rear wall 20, that appears wave-shaped in the plan view, of the machine 10 through which conveying channel the crop 20 harvested by the intake and mowing drums 12 is transported sideways to the center of the machine 10. The sideways transport in the conveying channel 22 is supported by transverse conveying drums 24 driven in rotation about vertical axes and provided with conveying disks for the transport of crop that extend through slots in the rear wall 20. The intake and mowing drums 12 are arranged in the valleys of the waves of the wave-shaped rear wall 20, while the transverse conveying drums 24 are positioned in the wave crests.

Slope conveyor drums 26 with axes of rotation inclined forward are arranged behind the two central intake and mowing drums 12 in the forward operating direction V that convey the harvested crop out of the conveying channel 22 to the rear into an intake channel 28 of a forage harvester with intake rolls 30 arranged in it one above the other. The deflecting of the crop to the rear is simplified by arc-shaped deflecting skids 32 that are arranged at the bottom of the machine 10 between the slope conveyor drums 26. The forward ends of the deflecting skids 32 also operate as take-up on the central intake and mowing drums 12. The enveloping circle of the inner transverse conveying drums 24 and the enveloping circle of the slope conveyor drum 26 overlap in order to optimize the transfer of the crop. This arrangement of transverse conveying drums 24 and slope conveyor drums 26 can be applied independently of the width definition element 36. The intake and mowing drums 12 are provided with flat covers 34.

The two outer intake and mowing drums 12' are driven in such a way that their front sides, facing forward in the forward operating direction, rotate in the inward direction. The crop is taken out at the side of the outer intake and mowing drum 12' that is turned towards the next inner intake and mowing drum 12, by take-out devices from the pocket-shaped recesses of the intake and mowing drum 12' and subsequently transported by means of the rear side of the next inner intake and mowing drum 12 along the rear wall 20. The remaining (not the outer) intake and mowing drums 12 rotate in such a way that the crop at their front sides is conveyed at first outward, then to the rear and then inward to the center of the machine. At a location opposite the transverse conveying drums 24, the crop is taken by take-out devices out of the pocket-shaped recesses of the intake and mowing drums 12. In this way, the crop is transported alternately by the intake and mowing drums 12 and the transverse conveying drums 24 through the conveying channel 22 to the center of the machine 10 where it is conducted by the slope conveyor drums 26 in the intake channel 28 of the forage harvester.

During the harvesting process, the machine 10 is moved over a field in the forward operating direction V. The stalk-like crop, if necessary, is deflected to the side by stalk dividers 18, is cut by the intake and mowing drums 12 and conducted into the conveying channel 22. Due to the conveying action of the rear sides of the intake and mowing drums 12 that follow downstream and the transverse conveying drums 24, the crop reaches the rear side of the two center intake and mowing drums 12, where it is deflected to the rear by the deflecting skids 32. The slope conveyor drums 26 conduct the crop to the intake rolls 30 of the forage harvester, where it is chopped and deposited on a wagon.

On the forward surface of the rear wall 20, as seen in the forward operating direction V, skid-shaped definition elements 36 are attached which extend over the length of the conveying channel and conform to the wave-shaped contour of the rear wall 20. The crop is conveyed in the conveying channel 22 between the intake and mowing drums 12 on the one hand, and the width definition elements 36 on the other hand. The width definition elements 36 are connected to rod-shaped struts 38 on their rear sides that extend through holes in the rear wall 20, and are supported in bearings, free to slide. The struts 38 are connected at their rear sides with helical springs 40, that are supported for their part on the rear wall 20. In the rest position shown in FIG. 2, the spring 40 is not loaded, although it would be conceivable that it be provided with a pre-load in the rest position. In the position shown in FIG. 4, the spring 40 is loaded. Here the width definition element 36 that is in contact with the rear wall 20 is used as a stop to limit the range of movement of the spring 40. In this way, the result is that the width definition elements 36 can be moved to the rear against the force of the spring 40, in the direction toward the rear wall 20. Several struts 38 and springs 40 are distributed over the length of the width definition elements 36. Since the width definition element 36, in addition, is sufficiently elastic in itself, and/or the strut 38 is guided and supported in bearings only to a limited degree in the sideways direction in the rear wall 20, the width definition element 36 can approach the rear wall 20 over its length to differing degrees corresponding to the immediate forces exerted on it. Underneath the width definition elements 36, further guide skids 42 are arranged that also conform to the curved shape of the rear wall 20, but are rigidly connected with it.

On the basis of a comparison of FIGS. 1 and 2 with FIGS. 3 and 4, the manner of operation of the movable width definition elements 36 can be seen. In FIGS. 1 and 2, the machine 10 is not loaded with stalk-like crop or loaded only to a slight degree. The width definition element 36 is in its rest position, that is, it is forced by the spring 40 so far forward until the latter is in contact with a stop. The width of the conveying channel 22 is defined and limited by the width definition element 36. Despite the small amount of conveyed crop, the plants are retained securely in the conveying channel 22. On the other hand, in FIGS. 3 and 4, the machine 10 is in a condition in which the conveying channel 22 is filled to a large degree with crop. The harvested crop forces the width definition element 36 to the rear toward the rear wall 20 against the force of the spring 40, so that the width definition element 36 opens up the entire width of the conveying channel 22. The latter can now accept large amounts of conveyed crop.

The width definition element 36 has the result that the harvested crop to be conveyed is securely retained in the conveying channel 22 whose width is automatically adjusted to the amount of harvested crop to be conveyed. Even with a low throughput, the harvested crop is securely retained and transported. In regions of large amounts of conveyed crop that occur primarily in the interior regions of the machine 10, the width definition element 36 can move further towards the rear than in regions of smaller amounts of conveyed crop that can be expected to occur primarily in the outer regions of the machine 10.

Having described the preferred embodiment, it will become apparent that various modifications can be made without departing from the scope of the invention as defined in the accompanying claims.

What is claimed is:

1. In a machine, for mowing of stalk-like crops, including several intake and mowing arrangements arranged in side-by-side relationship to each other across a cutting width of the machine at opposite sides of a central plane extending fore-and-aft through said machine, with a conveying channel located at each of opposite sides of said central plane and extending transversely between an outermost and an innermost intake and mowing arrangement located at a respective one of said opposite sides of said central plane, through which the crop that has been cut can be conducted to a crop processing arrangement located along said central plane behind said intake and mowing arrangements, the improvement comprising: each conveying channel including at least one upright, width definition element extending transversely substantially an entire length of said conveying channel; said width definition element being mounted for fore-and-aft movement between a rear extreme position establishing a maximum conveying channel width, and a front extreme position establishing a minimum conveying channel width; and a control arrangement being coupled to said width definition element and operable for establishing a working position of said width definition element as a function of the amount of harvested crop present at any given time within the conveying channel.

2. The machine, as defined in claim 1, wherein said control arrangement includes yieldable biasing arrangement resisting rearward movement of said width definition element from said front extreme position, whereby said width definition element may be moved rearward from said front extreme position by a force exerted on said width definition element by harvested crop.

3. The machine, as defined in claim 2, wherein said yieldable biasing arrangement is a spring arrangement.

4. The machine, as defined in claim 1, wherein said control arrangement includes at least two control elements operable for positioning said width definition element so as to establish different channel widths over the length of the conveying channel.

5. The machine, as defined in claim 4, wherein said control elements are located at respective positions spaced from each other over the length of the conveying channel and operable for defining different widths over the length of said channel in response to different amounts of harvested crops located at said positions.

6. The machine, as defined in claim 1, wherein said at least one width definition element extends substantially over the length of said channel.

7. The machine, as defined in claim 6, wherein said at least one width definition element is constructed so as to flex about substantially upright axes spaced along its length.

8. The machine, as defined in claim 6, and further including a rigid upright wall located behind and disposed in substantial parallel relationship to said at least one width definition element when substantially no crop is present in said channel.

9. The machine, as defined in claim 8, wherein said control element arrangement includes at least one yieldably biased member mounted to a rear side of, and projecting forwardly through said upright wall and being connected to said at least one width definition element.

10. The machine, as defined in claim 1, wherein a rigid rear, upright wall extends transversely behind said at least one width definition element and establishes said maximum width position of said at least one width definition element.

* * * * *